United States Patent Office 2,836,545
Patented May 27, 1958

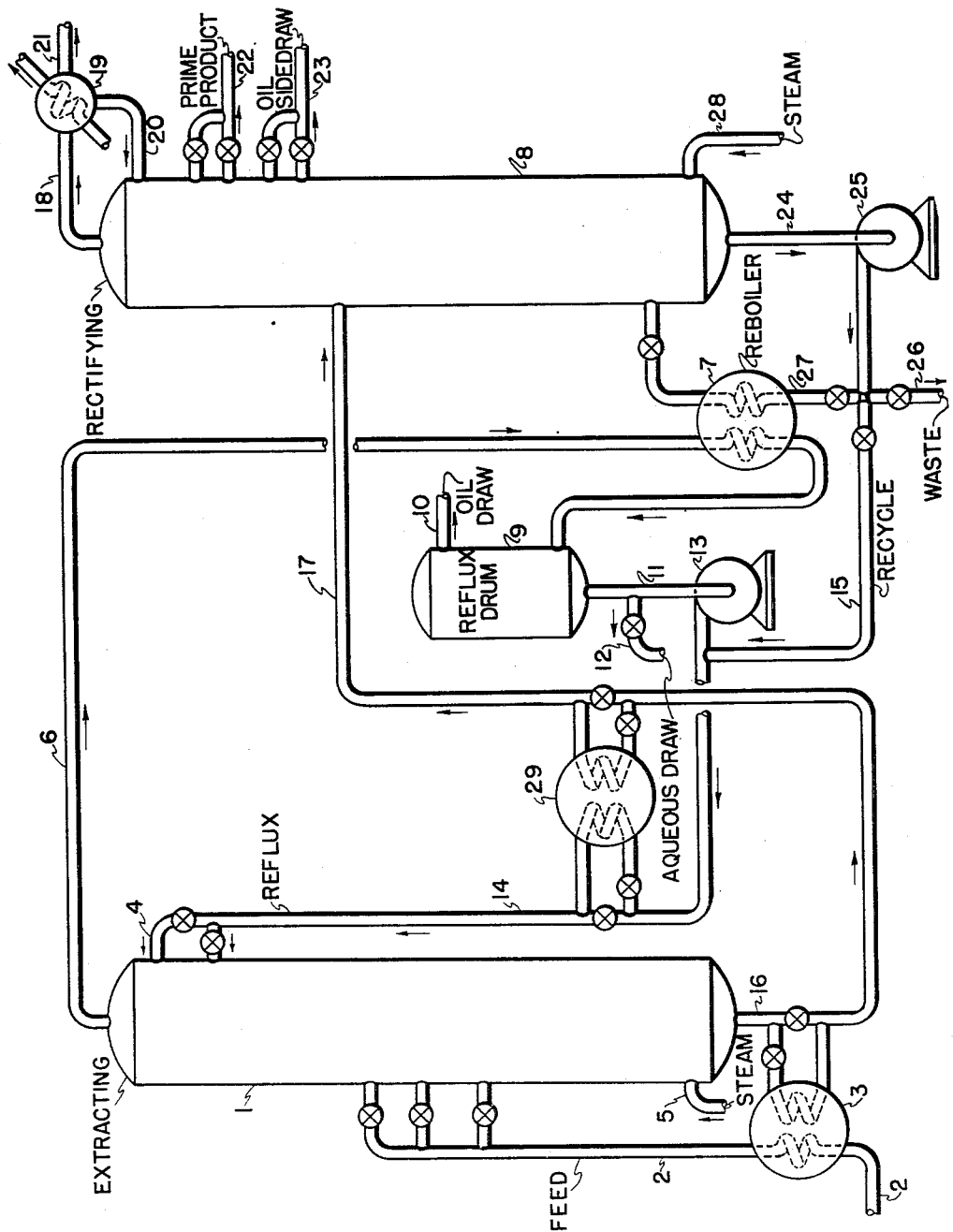

2,836,545

WATER EXTRACTIVE DISTILLATION OF ETHANOL

William E. Catterall, Summit, N. J., and Mack Castleman Fuqua, Baton Rouge, La., assignors to Esso Research and Engineering Company, a corporation of Delaware Application December 23, 1954, Serial No. 477,314

4 Claims. (Cl. 202—39.5)

This invention is concerned with purification of ethanol by a water-extractive type of distillation carried out with improvements by practically controlled pressures, temperatures and pH values.

This invention is concerned more particularly with production of a high quality ethanol from a crude alcohol which contains impurities formed in the synthesis of the alcohol by hydration of ethylene. Such a crude alcohol generally contains a substantial amount of diethyl ether among its low boiling impurities and contains higher boiling impurities which are largely hydrocarbon and water-insoluble, but some of which are also water-soluble oxygenated hydrocarbons.

General principles and requirements of a water-extractive distillation purification for crude aliphatic alcohols such as formed by hydration of a $C_2$ to $C_5$ mono-olefin are set forth in the U. S. Patent 2,638,440 of William M. Drout et al., patented May 12, 1953.

To obtain the objects of the present invention, it has been found desirable to remove the ether first from the crude alcohol stream, e. g. by topping in an ether column, in order to have the crude alcohol feed to the extractive distillation column substantially free of ether.

It will be noted that among the distinguishing features of the present invention, the extractive distillation is carried out with certain elevated pressures and temperatures in the extractive column to assure satisfactory distillation of impurities which can be separated from the overhead distillate in a small stream containing only a very small percentage of the alcohol processed. Such impurities are distilled from the dilute aqueous alcohol when these impurities are present in very small amounts with a large quantity of water at temperatures substantially above the normal boiling points of ethanol-water solutions, i. e. above the range of 172°–212° F. Among the distilled impurities are acidic substances which are evidently formed by decomposition of original neutral impurities at the high distillation temperatures and these acidic substances impart to the overhead distillate a pH on the acid side within the range of 5 to 7, usually of the order of 5 to 6. The residual aqueous alcohol withdrawn as bottoms from the extractive column tends to be appreciably more alkaline than the feed and this aqueous alcohol residue is fed to a rectifying column for distillation of the aqueous ethanol azeotrope and separation of high boiling impurities.

In the rectifying column, the pressure is adjusted to obtain an overhead at about atmosphere pressure and which has a pH close to 7.

A more detailed description of the steps will be given with reference to the drawing which shows a simplified process flow diagram.

An ether-free ethanol such as obtained from the bottom of an ether distillation column is passed into a midsection of the extractive distillation column 1 from feed line 2 and one of its valved inlets to the column. The feed stream may be preheated by heat exchange with a portion of the bottoms from column 1 as shown by the heat exchanger 3.

Sufficient water recycled from the bottom of the rectifying column 8 is added to the top of the extractive distillation column 1 along with reflux through line 4 so that the ethanol concentration of the bottoms in column 1 is maintained preferably in the range of 10–25 volume percent. Heat is supplied to the extractive distillation column by injection of high pressure steam through line 5 to maintain a bottoms reboiling temperature in the range of 280° to 350° F. under a pressure of 60 to 150 p. s. i. g. (pounds per square inch gauge).

With the pressure elevated in the extractive distillation column 1, the overhead vapors taken off through line 6 should contain about 51 to 71 volume percent of ethanol with the distilled impurities and water vapor at a vapor temperature in the range of 265 to 325° F. The overhead is condensed by heat exchange as in the reboiler 7 of the rectifying column 8, and the condensed overhead for column 1 is passed into the reflux drum for accumulation and possible phase separation. Water-insoluble impurities may separate as an upper oil phase in drum 9, in which case oil is withdrawn through line 10. The aqueous ethanol phase is withdrawn from the drum through line 11. A small portion of this aqueous phase containing 51–71 volume percent of ethanol is rejected through line 12 to remove impurities. A remaining portion of the aqueous ethanol distillate is returned as reflux to the upper part of column 1 by pump 13 and line 14. Controlled heat can be supplied to the reflux passed through heat exchanger 29 from the bottom of column 1. The reject of aqueous ethanol containing impurities may be transferred to a conventional fractionator for recovering ethanol.

The dilute ethanol (10 to 25 volume percent ethanol) in the aqueous bottoms of the extractive distillation column withdrawn from column 1 through line 16 is partly cooled by heat exchange and is fed by line 17 into the midsection of rectifying column 8 at a temperature in the range of 210° to 230° F. Rectifying vapors leave the top of column 8 as overhead distillate through line 18 to a condenser and reflux drum 19. A portion of the condensate is returned to the top of column 8 as reflux through line 20, the remaining overhead distillate being withdrawn as a relatively lower grade alcohol product through line 21. Prime or relatively higher grade product is withdrawn as a side stream from an upper plate of column 8 through line 22. High-boiling impurities which concentrate particularly on plates above the feed plate are withdrawn through line 23. Actual phase separation normally does not occur at this point and is not necessary. If desired, a water-insoluble organic liquid or hydrocarbon oil may be admixed for obtaining a phase separation.

Water bottoms are withdrawn from the bottom of column 8 by line 24 and can be circulated through a pump 25. A portion of the water bottoms from column 8 is rejected through line 26 as waste. This bottoms water should have a pH in the range of 7 to 8.5, i. e. should be neutral or slightly alkaline. A portion of the water bottoms is circulated through the heat exchanger 7 through line 27 to be reboiled by the higher temperature overhead vapors of column 1 being condensed under pressure. To supply adequate heat for the rectification, additional steam is injected through line 28. By operating column 8 with essentially atmospheric pressure at the top, e. g. 14 to 15 p. s. i. a., the overhead vapor temperature is about 170° to 175° F.

The higher quality ethanol product (95 volume percent ethanol) drawn off near the top of column 8 is cooled and transferred to storage tanks from line 22. The overhead vapors will also contain about 95 volume percent ethanol with extra amounts of impurities. A small portion of the overhead distillate is withdrawn to remove the trace impurties, or may be recycled through both the ether column and extractive distillation column for repurification. Normally this small overhead ethanol product can be used where the highest quality is not necessary.

The remaining high boiling impurities are withdrawn just above the feed plate in column 8 as a side stream through line 23 along with appreciable amounts of ethanol. This material may be sent to a separate unit for recovery of the alcohol. The rectifying column 8 may have a small amount of alcohol present in the residual water (about 0.02 to 0.3 weight percent ethanol). Under conditions of good control the alcohol loss in this stream is negligible. Steam generated in the reboiler 7 is returned to the rectifying column 8 to supplement the low pressure steam from line 28. A portion of the bottoms water stream is rejected and a remaining portion is recycled through line 15.

The following example is given to set forth the best mode contemplated for carrying out the invention.

*Example*

Crude ethanol prepared by hydration of ethylene absorbed in concentrated sulfuric acid was fractionally distilled under pressures of 20 to 25 p. s. i. g. to take overhead an industrial grade ethyl ether containing 0.1 to 0.8 wt. percent ethanol. A portion of the overhead condensate was refluxed. The ether-free ethanol bottoms from the ether distillation column was fed under elevated pressure of 120 p. s. i. g. and with a preheat temperature of 285° F. into the midsection of the extractive distillation column. This ethanol feed stream was practically neutral with a pH of 7.

High pressure steam was injected at a temperature of 344° F. and 110 p. s. i. g. into the bottom of the extractive distillation column. About 38 parts by weight of the steam were injected per 100 parts of extractive column feed containing about 30% by weight of ethanol, 70 wt. percent water and less than 0.1% impurities. Efforts to analyze for specific impurities in the feed were hampered by the very low concentration of individual impurities, despite the fact that these low concentration of impurities have remarkable effects in contaminating the quality of the finished ethanol product. However, a number of analyses of similar crude ethanols have shown the following range of impurity concentration in the extractive column feed:

TABLE I

| Impurity: | Concentration, p. p. m. (wt.) |
|---|---|
| Dowtherm | 40–150 |
| Carbonyls as $C_6$ | 10– 50 |
| Polymers | 140–450 |
| Total | 190–650 |

The overhead at 285° F. and 80 p. s. i. g. from the extractive distillation column contained about 55 wt. percent ethanol, 40 wt. percent water and 5% of impurities. Except for a relatively small amount discarded, amounting to less than 1% of the overhead distillate, the distillate was refluxed at a temperature of 270° F. to the top of the extractive distillation column with nearly twice its weight of recycle water added. The pH values of the overhead distillate of 5–5.7 indicated the presence of acidic decomposition products resulting from the high temperatures maintained in the extractive distillation column.

In the dilute aqueous ethanol bottoms of the extractive distillation column containing about 15 volume percent ethanol, impurities were present in a very small amount, amounting to probably less than 50 p. p. m. on extractive column feed. This dilute aqueous ethanol bottoms from the extractive distillation column after heat exchange against the recycle water stream and also against the fresh feed to the ether tower was fed at a temperature of 218° F. into the rectifying column. The pH of this dilute aqueous ethanol bottoms was in the range of 7.8–8.6.

In the rectifying column fractionation was carried out to obtain the atmospheric pressure azetrope at the top of the column where the temperature was maintained at close to 173° F. The overhead distillate of the rectifier was found to be neutral with a pH of 7 and to be of a high order of purity. An even higher grade alcohol was obtained in the top side stream. In refluxing all but a small portion of the overhead distillate and withdrawing as prime ethanol product a top side stream, the recovered high grade final product ethanol content amounted to about 92% yield of ethanol based on the ethanol content of the extractive column feed. The aqueous bottoms of the rectifying column showed pH values in the range of 7.8–8.4.

A comparison of product quality obtained in using the present invention is given in the following tabulation with a comparison to a product obtained from the same kind of crude ethanol using conventional distillation refining procedures.

TABLE II

| Tests | Conventional Refining | Refining by Present Method |
|---|---|---|
| Odor Class | 12+ | 2 to 6 |
| Permanganate Time, Min | 27 | 43 |
| Miscellaneous Organic Impurities | 0.6 | 0.016 |
| Ultra violet Absorbency: | | |
| 2,250 A | 0.335 | 0.205 |
| 2,700 A | 0.095 | 0.010 |

The tabulated data show that the ethanol product refined in accordance with the present invention is vastly superior in odor as indicated by the lower rating in the range of 2 to 6, reduction of oxidizable impurities which decrease the permanganate time, reduction in coloration in the miscellaneous organic impurities test, and reduction in unsaturated and carbonyl impurities which show up in the ultraviolet light absorbency.

Noteworthy and unusual results are shown by typical stream analyses as given in Table III:

First, the total prime ethanol product recovery is remarkably high amounting to 91% of the ethanol fed to the extractive distillation column. The balance of the ethanol is accounted for and essentially all recoverable as lower quality ethanol products.

Second, it is surprising how small a stream from line 12 need be removed from the system as indicated and so as to permit the prime alcohol to be obtained in the final stream. Not more than about 1% of the ethanol has to be taken out of the system at this point, the remainder of the ethanol in the overhead being refluxed to column 1.

Third, the low temperatures in column 8 restrict the amount of decomposition. Thus, the prime alcohol is kept neutral and satisfactorily freed of contaminants.

The stream compositions given in Table III show why it is advantageous to have a separate column for separating ethyl ether. It might be felt that ether would readily be rejected by water extractive distillation due to its high vapor pressure and water insolubility. It is true that the ether would readily be rejected overhead in the extractive distillation, but unfortunately the ether overhead would contain large amounts of alcohol, and a second separation step would still be necessary to purify the ether and recover the alcohol. Under the preferred extractive distillation conditions the amount of reflux water used relative to overhead vapor is insufficient to keep a large amount of ethanol from passing overhead. As given in Table III, the composition of this overhead stream is about 60% alcohol, and the amount of alcohol in the overhead is about equal to the alcohol

TABLE III

*Stream analyses (quantities in parts per 100 parts of feed)*

| | Extracting Column 1 | | | | Rectifying Column 8 | | | | | |
|---|---|---|---|---|---|---|---|---|---|---|
| | 2 | 6 | 14 | 12 | 17 | 18 | 21 | 22 | 26 | 23 |
| | Feed | O'hd | Reflux | Aqueous Draw | Feed | O'hd | O'hd Prod. | Prime Prod. | Waste | Side Draw |
| EtOH | 30.9 | 33.6 | 33.3 | 0.30 | 30.6 | 70.5 | 1.53 | 28.5 | <0.03 | 0.61 |
| $H_2O$ | 69.05 | 16.5 | 124.3 | 0.13 | 214.0 | 5.8 | 0.13 | 2.4 | 117.7 | 1.80 |
| Impurities | 0.05 | 3.40 | 3.37 | 0.03 | 0.02 | | 0.00 | 0.00 | 0.01 | 0.01 |
| Total | 100.00 | 53.5 | 161.0 | 0.46 | 244.6 | 76.3 | 1.66 | 30.9 | 117.7 | 2.42 |
| °F | 235 | 285 | 285 | | 218 | 173 | 173 | 173 | 234 | 205 |
| P.s.i.g. | | 80 | | | | 0 | | | | |
| pH | 7 | 5.5 | 7 to 8 | 5.5 | 8 | 7 | 7 | 7.8 | 7.8 to 8.4 | 6.5 | in the feed. Obviously, practically all this stream must be refluxed to obtain good alcohol recovery. If the ether content of the feed (5–20% based on ethanol) had not been removed, the overhead stream would still contain at least 50% ethanol. Due to the relatively large amount of ether in the feed, the amount of ethanol that would have to be rejected with the overhead would represent a substantial percentage of the feed ethanol. This alcohol would have to be separated from the ether in a separate distillation and recycled back to the extractive column feed, thereby increasing the size of the extractive column. Depending upon the method used for finally distilling the ether from the alcohol, an undesirable amount of impurities might also recycle back to the extractive column along with the recycle ethanol. Therefore, it can be seen that it is more effective and probably at least as economical to separate the ether prior to extractive distillation.

The advantages of the present process with respect to promoting impurity decomposition in the extractive column operated under elevated pressure and minimizing this decomposition in the atmospheric pressure rectifying column have been demonstrated by a number of tests. Experience with water extractive distillation of crude ethanol has shown that decomposition of impurities during distillation has an important bearing on the final product quality. Actually the distillation system is so well designed that impurities of all types should theoretically be completely distilled away from the product.

Light materials of all types are rejected in both the ether tower and the extractive tower. All water-insoluble compounds except the very heaviest are rejected overhead in the extractive distillation. The residual heavy water-insoluble compounds are rejected in the rectifier either in the lower sidestream or in the water bottoms. Water-soluble compounds of course are not readily removed by the extractive distillation, except for the volatile compounds such as acetaldehyde. However, intermediate-boiling water solubles are removed with the rectifier side draw, and heavy water solubles are removed with the rectified bottoms. Thus, theoretically all types of compounds are readily removed by the distillation system, provided they are stable and remain unchanged in distillation behavior as they progress through the system. However, we have disclosed that all the impurities in crude ethanol are not stable, and as a result the purification is not complete.

One of the most disadvantageous types of decomposition behavior is to have an unstable heavy, water-soluble compound which readily passes through the ether and extractive columns into the rectifier column, where the decomposition produces a relatively light compound distilling into the ethanol product. An example of a compound of this type is acetaldol, which is completely water soluble and fairly high-boiling (B. P. 83° C. at 20 mm. Hg), but thermally unstable, decomposing to crotonaldehyde which in low concentrations distills right with the ethanol-water azeotrope and very seriously degrades the quality. According to U. S. 2,575,556, only 1 p. p. m. of crotonaldehyde drops the permanganate time of a pure ethanol product from 60 minutes to 30 minutes, an observation which has been checked. This patent also indicates the presence of acetaldol and other aldol-type compounds in synthetic ethanols, presumably derived from acetaldehyde which is formed in all synthetic ethanol processes.

In order to show the effect of acetaldol decomposition in the extractive distillation system, a series of three laboratory continuous distillation columns containing perforated glass plates were set up with sidestreams, solvent recirculation, and other features exactly simulating a commercial plant as heretofore described. However, one exception was that for experimental convenience all towers were operated at atmospheric pressure. A highly purified ethanol was diluted to 35% strength with distilled water. When feeding this through the complete extractive distillation process a product of excellent quality having a permanganate time of 51 minutes was obtained. When 5 p. p. m. of crotonaldehyde was added to the pure 35% alcohol feed before processing, the product alcohol permanganate time was 34 minutes. This indicated that about 0.6 p. p. m. crotonaldehyde was present in the 95% ethanol product, indicating further that the extractive distillation system was removing about 97% of the crotonaldehyde fed. When 5 p. p. m. of acetaldol was added to the feed, the product permanganate time was only 13 minutes, corresponding to 2.5 p. p. m. of crotonaldehyde in the product due to aldol decomposition. This amount of crotonaldehyde is equivalent to the decomposition of 10% of the aldol fed. Presumably this amount of decomposition occurred mainly in the rectifier, since crotonaldehyde formed in the extractive tower would largely distill overhead in that tower as in the case when crotonaldehyde was added to the feed.

Although a parallel demonstration of pressure in the extractive tower was not made, it is apparent that pressure would be beneficial by promoting the decomposition of compounds such as acetaldol prior to their entering the rectifying zone. It is also apparent that the use of pressure in the rectifier would be highly disadvantageous. Therefore, for a high quality product the only combination in which one of the two towers could be under pressure in order to employ the vapor reuse system would be the one in which the extractive column is under pressure. This is not the most economical combination and would not be the conventional choice. Disregarding what we have discovered about quality effects, the logical method would be to operate the rectifier under pressure and the extractive column at atmospheric pressure, for several reasons. First, the rectifier is the larger tower both in terms of plates (55–75 plates vs. 45 plates in the extractive tower) and diameter (about 80% more total heat). Therefore, the rectifier tower offers the most opportunity for reducing tower cost by resorting to pressure in order to reduce tower size. Second, the larger heat input to the rectifier makes more heat available for reuse if this tower is operated under pressure. Enough heat would be available from the rectifier overhead to operate both the extractive tower and the ether tower as well as possibly other towers at the same plant. On the other hand, when the extractive tower is under pressure, it does not supply enough heat in the overhead to operate the rectifier, and additional steam must be added to the rectifier. However, despite this disadvantage in economy, pressure in the extractive column is the only vapor-reuse system capable of producing highest quality ethanol from typical crude synthetic ethanols.

The invention described is claimed as follows:

1. In a process of using water extractive distillation for purifying crude ethanol contaminated by small amounts of impurities including higher boiling hydrocarbon oils and oxygenated organic compounds but substantially freed of diethyl ether, the improvement which comprises distilling said impurities and their decomposition products with some of the ethanol and water in a water extractive distillation zone at temperatures substantially above the range of 172° F. to 212° F. throughout said zone by maintaining superatmospheric pressures of 60–150 p. s. i. g. therein, maintaining bottoms temperatures of said zone in the range of 280°–350° F. to decompose unstable higher boiling impurities present in the bottoms, thus forming volatile acidic decomposition products which are removed overhead with distilled vapors, thus given a pH in the range of 5 to 7 while the residual bottoms is thus made alkaline with a pH in the range of 7.5 to 9, passing the resulting dilute alkaline aqueous ethanol residue of the bottoms from the extractive distillation zone to a rectifying zone, and distilling from said rectifying zone a substantially neutral, purified, aqueous ethanol fraction at lowered pressures close to one atmosphere.

2. In the process defined by claim 1, passing overhead vapors from the water extractive distillation zone at temperatures in the range of 265° to 325° F. in indirect heat exchange with bottoms of the rectifying zone to supply heat to the rectifying zone and condense vapors of said overhead, separating from the condensed overhead an oil-containing stream, withdrawing a small portion of the remaining aqueous alcohol phase containing water-soluble impurities, and refluxing a major portion of the condensed aqueous ethanol phase from the overhead to the upper part of said water extractive distillation zone.

3. In the process of purifying crude ethanol contaminated by small amounts of higher boiling hydrocarbon oils and oxygenated organic compounds formed in the hydration of ethylene, the improvement which comprises passing the crude ethanol substantially free of diethyl ether but contaminated by said higher boiling contaminants into a water extractive distillation zone, supplying sufficient water to the upper part of said zone to make the ethanol concentration in the aqueous bottoms of said zone 10 to 25 volume percent, maintaining in said zone a pressure in the range of 60 to 150 p. s. i. g., heating the bottoms in said zone to a temperature in the range of 280° to 350° F. to decompose some of the impurities, removing vapors overhead from said zone at a temperature in the range of 265° to 325° F. to have overhead distillate with a pH in the range of 5 to 7 contain from 51 to 71 volume percent of ethanol with distilled acidic impurities and water, separating from the resulting overhead distillate a small portion thereof to eliminate impurities, refluxing a remaining major portion of the overhead condensate to the upper part of said extractive distillation zone, passing the aqueous bottoms from said extractive distillation zone into an intermediate part of a rectification zone and distilling ethanol in said rectification zone under atmospheric pressure to obtain an ethanol distillate which is substantially neutral.

4. In a process of using water extractive distillation for purifying ethanol contaminated by small amounts of impurities including higher boiling hydrocarbon oils and oxygenated organic compounds, the improvement which comprises distilling said impurities and decomposition products thereof with some of the ethanol and water in a water extractive distillation zone at temperatures of 265 to 350° F. and superatmospheric pressures of 60 to 150 p. s. i. g., supplying sufficient water to the upper part of said zone to make the ethanol concentration in the aqueous bottoms about 10 to 25 volume percent, heating the bottoms in said zone to a temperature in the range of 280 to 350° F. to decompose some of said higher boiling impurities in said bottoms into more volatile decomposition products which are distilled overhead in a vapor mixture having a pH in the range of 5–7 while the residual bottoms are thus given an alkaline pH in the range of about 7.5–9, passing the resulting alkaline aqueous ethanol bottoms from the extractive distillation zone to a rectifying zone, and distilling from said rectifying zone a substantially neutral, purified, aqueous ethanol fraction at lowered pressures close to one atmosphere.

References Cited in the file of this patent

UNITED STATES PATENTS

| 2,340,012 | Mottern | Jan. 25, 1944 |
| 2,638,440 | Drout | May 12, 1953 |
| 2,648,711 | Carrier | Aug. 11, 1953 |

FOREIGN PATENTS

| 673,768 | Great Britain | June 11, 1952 |